United States Patent
Dieterle et al.

(10) Patent No.: US 6,874,711 B2
(45) Date of Patent: Apr. 5, 2005

(54) WATER JET AERATOR (JET CONTROLLER)

(75) Inventors: Joachim Dieterle, Lossburg/Schoemberg (DE); Franz Schorn, Schiltach (DE)

(73) Assignee: Hansgrohe AG, Schiltach (DE)

( * ) Notice: Subject to any disclaimer, the term of this patent is extended or adjusted under 35 U.S.C. 154(b) by 0 days.

(21) Appl. No.: 10/296,573

(22) PCT Filed: Mar. 26, 2002

(86) PCT No.: PCT/EP02/03359
§ 371 (c)(1),
(2), (4) Date: Jan. 27, 2003

(87) PCT Pub. No.: WO02/077374
PCT Pub. Date: Oct. 3, 2002

(65) Prior Publication Data
US 2003/0146302 A1 Aug. 7, 2003

(30) Foreign Application Priority Data
Mar. 26, 2001 (DE) .......................... 101 15 639

(51) Int. Cl.⁷ .............................. B05B 1/00; E03C 1/08
(52) U.S. Cl. .................................. 239/602; 239/428.5
(58) Field of Search ............................. 239/602, 428.5, 239/428.1, 601, 615

(56) References Cited

U.S. PATENT DOCUMENTS

| | | | | |
|---|---|---|---|---|
| 4,657,186 A | * | 4/1987 | Shapiro | 239/462 |
| 5,228,625 A | * | 7/1993 | Grassberger | 239/558 |
| 5,405,089 A | * | 4/1995 | Heimann et al. | 239/533.14 |
| 5,495,985 A | * | 3/1996 | Nehm et al. | 239/428.5 |
| 5,730,361 A | * | 3/1998 | Thonnes | 239/106 |
| 6,270,022 B1 | * | 8/2001 | Knapp | 239/428.5 |
| 6,588,682 B1 | * | 7/2003 | Flieger | 239/428.5 |

FOREIGN PATENT DOCUMENTS

| | | |
|---|---|---|
| DE | 1 940 087 | 2/1970 |
| DE | 7 118 779 | 5/1971 |
| DE | 35 43 553 | 5/1989 |
| DE | 196 47 798 | 5/1998 |
| DE | 198 52 411 | 5/2000 |
| EP | 0429068 A1 * | 5/1991 |
| EP | 0 429 068 | 5/1991 |
| EP | 0 721 031 | 7/1996 |
| EP | 1 001 095 | 11/1999 |
| FR | 2 392 182 | 10/1976 |

OTHER PUBLICATIONS

German Search Report.
PCT Search Report.

* cited by examiner

*Primary Examiner*—Willaim C. Doerrler
(74) *Attorney, Agent, or Firm*—Duane Morris LLP

(57) ABSTRACT

A water jet aerator (jet controller) for a water outlet of a sanitary fitting has a substantially cup-shaped, plastic housing in which is located a device for mixing air with water made from a stable dimensionally rigid thermoplastic. The housing has a housing base molded in one piece therewith and which is constructed as a jet stabilizing device and is provided with water outlets between jet limiting walls parallel to the flow direction and which at the water outlet end have an elastic plastic surface. In the invention the jet limiting walls, at least in the vicinity of the water outlet, are solidly constructed from the elastic plastic over their entire wall thickness and are molded in one piece with the housing.

14 Claims, 3 Drawing Sheets

WATER JET AERATOR (JET CONTROLLER)

BACKGROUND OF THE INVENTION

The invention relates to a water jet aerator (jet controller) for a water outlet of a sanitary fitting with an essentially cup-shaped plastic housing, in which is located a device for mixing water and air, the housing having a housing base shaped in one piece therewith and which is constructed as a jet stabilizing device and which has water outlet openings between jet limiting walls arranged parallel to the flow direction and having at the water outlet end an elastic plastic surface.

PRIOR ART

Water jet aerators of this type are known from DE-A1-198 52 411A. In the case of said water jet aerators the ends of the walls directed in the flow direction are covered with an elastic plastic surface layer. Said plastics material largely prevents lime deposits. If lime deposits have occurred, they can be removed by wiping off. The manufacture of such water jet aerators is relatively complicated, because during manufacture the shaping of the thin surface layer makes high demands on the accuracy of fit of the molds, because otherwise the transition of the surface layer in the boundary area with the thermoplastic material of the remaining housing is irregular. In addition, an improved detachability of any lime deposits is desired.

SUMMARY OF THE INVENTION

The invention is characterized in that the jet boundary walls, at least in the vicinity of the water outlet, are constructed solidly from elastic plastic over their entire wall thickness and are shaped in one piece with the housing.

As a result of this solid construction of the wall ends, injection molding errors during the manufacture of the surface from the elastic plastic are avoided, which is particularly advantageous if the plastics material used is silicone which, during the injection molding process, is very highly fluid. Moreover, as the wall ends are made solidly from elastic plastic, they can be clearly moved backwards and forwards, so that even further inwardly projecting time deposits can be mechanically detached. The elastic plastic is generally an elastomer. It preferably also has water-repellent characteristics, like silicone. The Shore A hardness of the elastic plastic is preferably 40 to 80, particularly 55 to 80. Rubbery elastomers such as EPDM (ethylene/propylene-diene-terpolymer) or NPR (nitrile-butadiene rubber) are for example suitable, as is the aforementioned silicone. Particularly preference is given to thermoplastic elastomers, which can be in the form of mixtures of thermoplastics and elastomers, e.g. polypropylene and EPDM. There are also thermoplastics which have been rendered elastic, such as thermoplastic-elastomeric polyamides, polyolefins, polyurethanes and styrene. Plastic pairs of thermoplastics and elastomers respectively thermoplastic elastomers suitable for two-component injection molding are also known, the individual components having a good mutual adhesiveness. Such components are preferred for the invention, because the water jet aerators according to the invention are preferably manufactured by two-component injection molding processes.

Considered in the jet direction, the jet limiting walls are made over a length of at least 1.0 mm and in particular 1.5 to 4 mm from elastic plastic. In a preferred embodiment of the invention in the vicinity of the water outlet opening the water jet limiting walls are made from elastic plastic over a length of 1.5 to 3 mm and the remainder of the housing is made from a dimensionally rigid thermoplastic, both plastics being shaped into a common part by two-component injection molding.

In another preferred embodiment the mixing device is a component constructed separately from the housing and is inserted in the latter. Preferably engaging elements of the mixing device and the housing permit a seating, connected to rotate, of the mixing device in the housing. The mixing device is always made from a dimensionally stable thermoplastic, whose Shore A hardness is preferably >90, particularly >100.

In an embodiment of the invention at least part of the interfaces between the dimensionally rigid plastic of the housing and the water-repellent and/or elastic plastic of the wall ends in a cross-sectional plane perpendicular to the flow direction. This is preferably the case at least at the wall surface. As a result the connecting surface is admittedly extremely small, but it has been found that this small surface is generally adequate. However, it may also be desired for at least one part and preferably only one part of the interfaces between wall sections from the dimensionally rigid, thermoplastics material and the wall sections of the elastic plastic to be larger than the cross-sectional surfaces through the walls. For this purpose in the vicinity of the interface the walls are preferably stepped and in particular have at least one step. Thus, advantageously the stepping consists of the wall sections in the interface area being stepped on both sides and in particular a web set back with respect to the wall surfaces can be provided at the interface. An end tooth system is also possible.

In a particularly advantageous embodiment of the invention wall sections belonging to the outer wall of the housing have an enlarged interface, whereas wall sections belonging to the housing base essentially have interfaces running perpendicular to the flow direction and in particular those located in the cross-sectional plane. Thus, the wall sections possibly exposed to an undesired strong mechanical action can be especially protected against tearing away in the region of the outer jacket of the housing, which need not be the case for the wall sections located further inwards in the cup base area.

As a rule the housing comprises a cylindrical body. The walls can be in the form of concentric circles, which are interconnected by radial webs.

In another embodiment of the invention the housing is entirely made from elastic plastic. This embodiment allows a particularly simple manufacture, because only one component has to be injection molded. It is advantageous in this embodiment if the jet mixing device has on its upper outer edge a flange, with which it is supported on an upper edge of the housing, which roughly corresponds to an upper cut edge. Thus, any compressive stresses emanating from the water pressure can be absorbed by the jet whirling device, without being transferred into the housing.

The separation construction of housing and jet whirling device permits an easy design of the molds for the manufacture of the housing, which is particularly advantageous for two-component injection molding. However, it is also possible to mold together with the housing the jet mixing device and in particular from the dimensionally stable thermoplastics material.

Further features of the invention can be gathered from the following description of preferred embodiments in conjunction with the drawings and claims.

BRIEF DESCRIPTION OF THE DRAWINGS

The individual features can in each case be implemented singly or combination with one another. In the drawings show.

DETAILED DESCRIPTION

Figure 1:
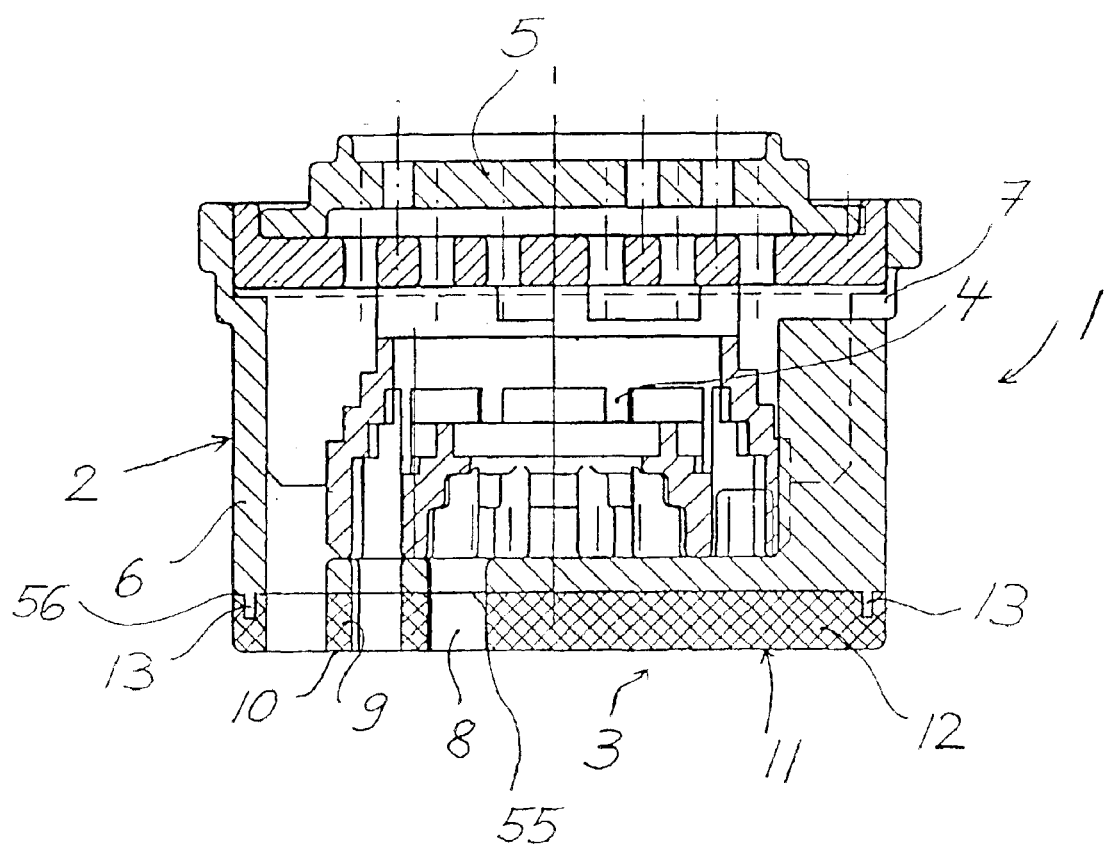
FIG. 1 A section through an embodiment of the invention.

FIG. 1 shows in cross-section an embodiment of a water jet aerator 1 according to the invention. Such water jet aerators are generally known as jet controllers. The water jet aerator has a cup-shaped, cylindrical housing 2, which has a perforated bottom 3. In the housing 2 is located a mixing device 4 for mixing water and air, which cooperates with a jet splitting device 5 in the form of two perforated plates, which split up the incoming water into individual jets. In the upper area of the housing jacket 6, the housing 2 has air inlet openings 7. Through a vacuum produced by the individual jet air is sucked through these openings and mixed with water by the mixing device. The mixing device 4 can have numerous different designs. In the present case several, annularly constructed steps are arranged concentrically to one another.

The perforated bottom 3 has outlet openings 8 for the mixture of water and air and the individual openings are surrounded by thin jet limiting walls 9, which are oriented substantially in an aligned manner with the solid parts of the mixing device. In the embodiment shown the jet limiting walls 9 are in the form of concentric rings 10 interconnected by radial webs 11. The thickness of the jet limiting walls is generally max approx. 1 mm.

A section 12 of the perforated bottom 3, respectively the jet limiting walls 9 directed towards the water outlet end is made from an elastomer, e.g. silicone, which is injection molded. Its Shore A hardness is approx. 60 to 70. The remaining part of the housing, i.e. the part of the perforated bottom 3 directed counter to the flow direction and the housing jacket 6 is made from a dimensionally rigid thermoplastic with a Shore A hardness of >90, which is able to form a good adhesive connection with the elastomer during two-component injection molding. The length of the sections of the jet limiting walls 9, which are made from the elastomer, is approximately 2 to 3 mm, the interface between the elastomeric sections and the jet limiting wall sections made from dimensionally stable thermoplastic is located in a cross-sectional plane 55 at right angles to the flow direction. Only in the vicinity of the outer jacket 6 does the wall section made from dimensionally stable thermoplastic have a narrow, cross-sectionally rectangular rib 13, which is stepped with respect to both outer faces of the wall section. However, also here there is a sharp transition between the dimensionally stable thermoplastic and the soft elastomer with a partial interface perpendicular to the surface. This rib 13 brings about a mechanical stiffening of the start of the elastomeric section of the outer jacket 6 and which is particularly desired if the elastomeric section in the outer jacket region projects somewhat further than in the other wall sections.

Due to the fact that the mixing device 4 is molded as a separate component and inserted in the housing 2, the latter can be easily manufactured by a two-component injection molding process, namely in a two-cavity or chamber mold. Firstly the housing part made from dimensionally stable plastic, i.e. essentially the housing jacket and the part of the perforated bottom 3 pointing counter to the flow direction is injection molded , followed by the injection molding onto the same of the elastomeric plastic part of the perforated bottom. For this purpose the prefabricated dimensionally stable thermoplastic body can be transferred to another chamber of the mold and simultaneously in the first chamber a new body is formed. It is also possible to construct a mold in such a way that following the first injection molding process they are moved apart somewhat and then the elastomeric section is molded.

Figure 2:
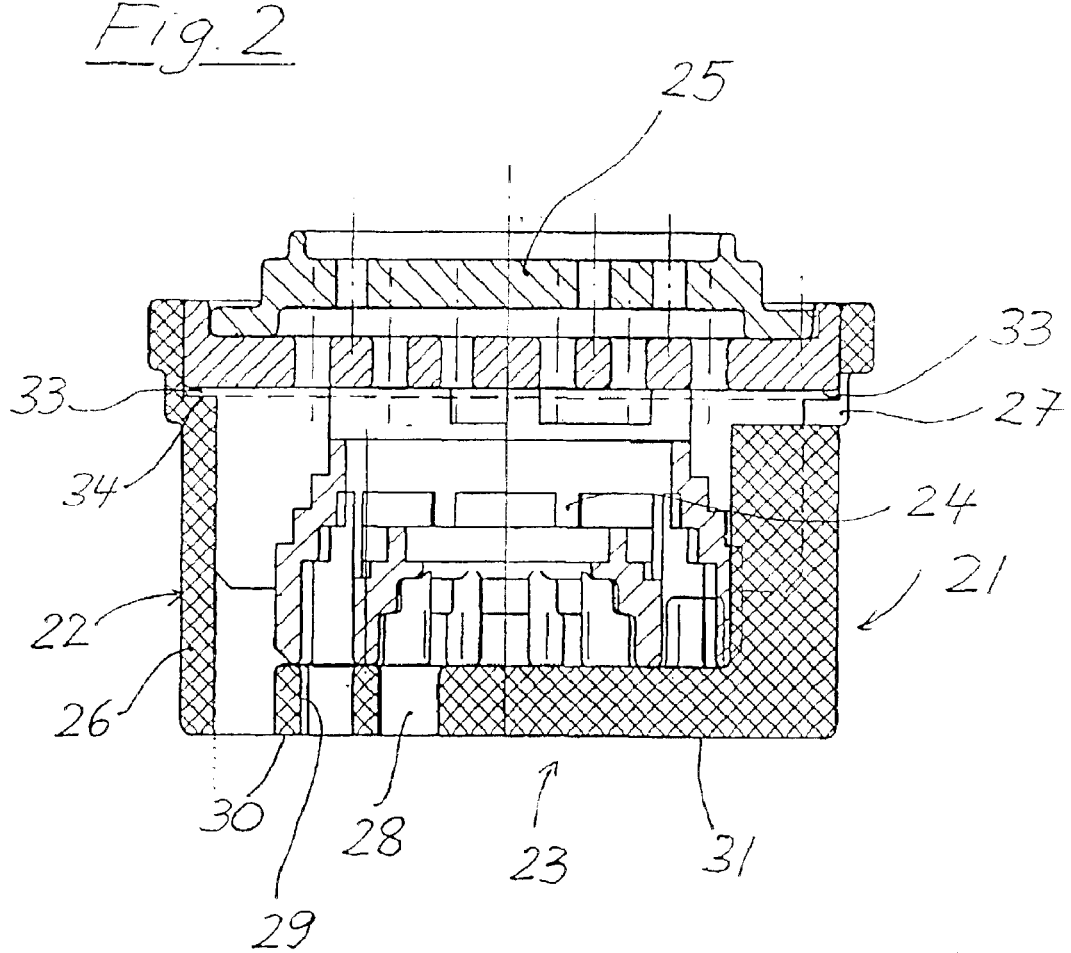
FIG. 2 A section through another embodiment.

In the embodiment according to FIG. 2 a water jet aerator 21 has a housing 22, which is completely, i.e. including the entire perforated bottom 23 with the jet limiting walls 29, made from elastomeric plastic. Thus, here there are no interfaces between the dimensionally stable thermoplastic and the elastomer.

Here again there is a mixing device 24 made from a dimensionally stable plastic and constructed as a separate component. It is provided on its upper outer edge with a flat flange 33, which is supported on an upper shoulder 34 of the housing jacket 216 and is located between the shoulder 34 and plates of the jet splitting device 25. As a result of said flat flange 33 the mixing device 24 is supported in the vicinity of the mounting support of the water jet aerator 21, so that no mechanical or hydraulic forces are exerted on the elastic housing 22.

As can be gathered, the manufacture of this embodiment is particularly easy, because the entire housing can be manufactured from one material in a simple injection molding process.

Otherwise this embodiment is the same as that of FIG. 1, so that corresponding parts carry corresponding reference numerals.

Figure 3:
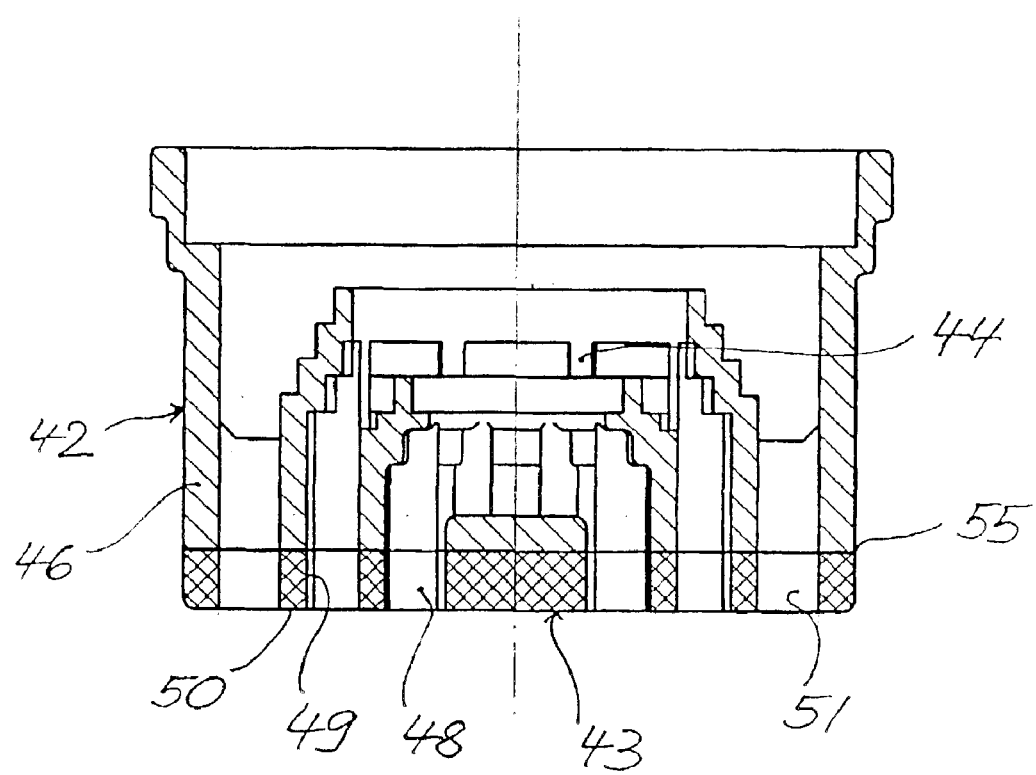
FIG. 3 A section through the housing and mixing device of a third embodiment.

FIG. 3 shows a housing 42 of a further embodiment and which is constructed in one piece with a mixing device 44. The housing top and the mixing device are made from a dimensionally stable thermoplastic. Sections of the jet limiting walls 49 pointing in the flow direction, i.e. the part of the perforated bottom 43 located at the water outlet are once again made from an elastomeric material, injection molded onto the dimensionally stable, thermoplastic material in a two-component injection molding process. As the mixing device 44 and perforated bottom 43 are made in one piece, the jet limiting walls 49 are constructed as extensions of corresponding wall parts of the mixing device 44 and the transition takes place without any cross-sectional change. The interface 55 between the thermoplastic material and the elastomeric material is located in the cross-sectional plane of the housing 42. This means that the full cross-section of the jet limiting walls 49 passes abruptly from one plastic into the other plastic and the surface extension of the interface 55 is small. The connection or interface can also be as in FIG. 1.

The housing 42 with the one-piece construction with the mixing device 44 is admittedly somewhat more complicated to manufacture than the embodiments according to FIGS. 1 and 2, but has the advantage that the inserted part 4 according to FIG. 1 is no longer manufactured and has to be fitted as an individual part. What is important is that also here the mixing device is made from a dimensionally stable plastic and consequently it is ensured that the individual jets striking it are effectively split up and mixed with the air, which is not the case with a soft material. This embodiment also makes it possible to make the end pieces of the jet limiting walls 49 from a soft, elastomeric material, so that it is possible to bend down up to an angle of 90° or more for lime removal purposes the wall end sections.

What is claimed is:

1. A water jet aerator (jet controller) for a water outlet of a sanitary fitting with a substantially cup-shaped plastic housing, in which is located a device made from dimensionally stable thermoplastic material, for mixing water with air, the housing having a housing base molded in one piece therewith and which is constructed as a jet stabilizing device and has water outlet openings between jet limiting walls positioned parallel to a jet direction and which at a water outlet end have an elastic plastic surface, wherein the jet limiting walls have a thickness generally of a maximum of approximately 1 mm and the jet limiting walls at least in a vicinity of the water outlet end, and in the jet direction over a length of at least 1.0 mm are made solidly from elastic plastic over their entire wall thickness and are molded in one piece with the housing.

2. The water jet aerator according to claim 1, wherein the elastic plastic is an elastomer.

3. The water jet aerator according to claim 1, wherein, considered in the jet direction, the jet limiting walls are made from elastic plastic over a length of 1.5 to 4 mm.

4. The water jet aerator according to claim 1, wherein the jet limiting walls are made from elastic plastic in a vicinity of water outlet openings over a length of 1.5 to 3 mm from the water outlet end and a remainder of the housing is of a dimensionally rigid thermoplastic and both plastics are molded by two-component injection molding.

5. The water jet aerator according to claim 1, wherein the mixing device is a component constructed separately from the housing.

6. The water jet aerator according to claim 1, wherein the mixing device is mounted in axially and radially fixed manner in the housing.

7. The water jet aerator according to claim 1, wherein interfaces between the dimensionally stable, thermoplastics material and the elastic plastic are located in a cross-sectional plane perpendicular to a flow direction.

8. The water jet aerator according to claim 1, wherein interfaces between wall sections of the dimensionally stable thermoplastics material and wall sections of the elastic plastic are larger than cross-sectional faces through the walls.

9. The water jet aerator according to claim 8, wherein, in a vicinity of an interface between the thermoplastics material and the elastic plastic, the jet limiting walls are stepped.

10. The water jet aerator according to claim 9, wherein wall sections of the dimensionally stable thermoplastics material are stepped on both face sides in an area of the interface.

11. The water jet aerator according to claim 8, wherein wall sections belonging to an outer jacket of the housing have an enlarged interface and wall sections belonging to the housing base have interfaces directed substantially perpendicular to the jet direction.

12. The water jet aerator according to claim 1, wherein the housing is made entirely from at least one plastic from the group consisting of water-repellent plastic and elastic plastic.

13. The water jet aerator according to claim 1, wherein the elastic plastic is a thermoplastic elastomer.

14. The water jet aerator according to claim 8, wherein, in a vicinity of a interface between the thermoplastics material and the elastic plastic, the jet limiting walls have at least one step.

* * * * *